H. P. MOLANDER.
WAVE MOTOR.
APPLICATION FILED DEC. 3, 1913.
1,098,518.
Patented June 2, 1914.
2 SHEETS—SHEET 1.
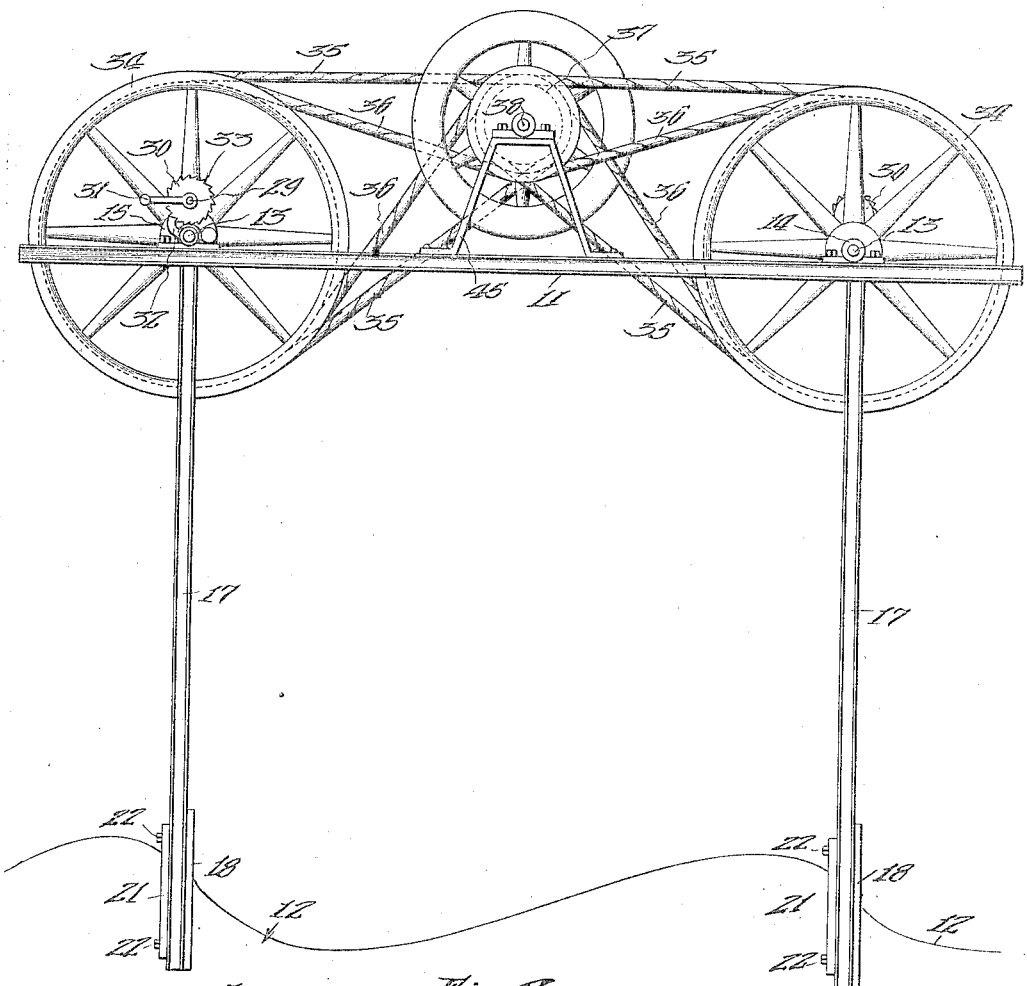
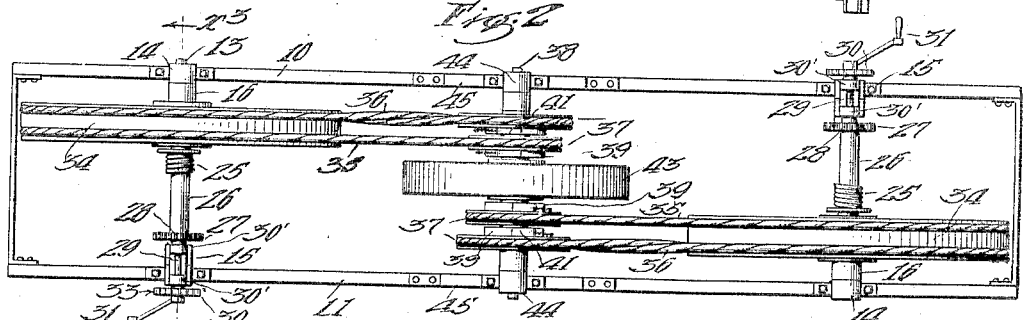

H. P. MOLANDER.
WAVE MOTOR.
APPLICATION FILED DEC. 3, 1913.
1,098,518.
Patented June 2, 1914.
2 SHEETS—SHEET 2.
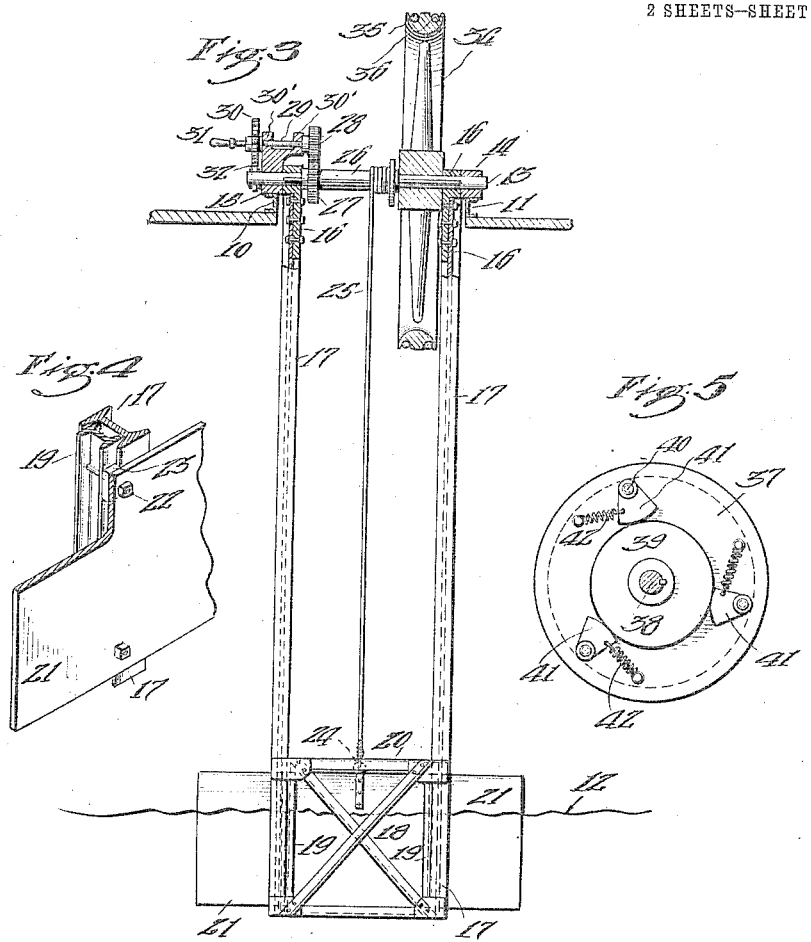
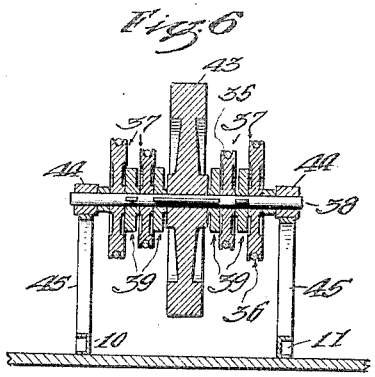
Witnesses:
Louis W. Gratz.
Ford. W. Harris
Inventor;
Hans P. Molander,
by Townsend & Graham
his attys.

UNITED STATES PATENT OFFICE.

HANS P. MOLANDER, OF LOS ANGELES, CALIFORNIA.

WAVE-MOTOR.

1,098,518.　　　Specification of Letters Patent.　　Patented June 2, 1914.

Application filed December 3, 1913. Serial No. 804,387.

*To all whom it may concern:*

Be it known that I, HANS P. MOLANDER, a subject of the King of Sweden, residing at Los Angeles, in the county of Los Angeles and State of California, have invented a new and useful Wave-Motor, of which the following is a specification.

My invention relates to wave motors and particularly to those actuated by the impact of the waves or currents on flat paddles.

The principal object of my invention is to provide a mechanism which will be simple in design and which may be installed without complicated framework, all the parts being supported upon a single pair of beams.

A further object is to provide such a mechanism which will be continuous in operation and without dead centers. In such mechanism a peculiar form of ratchet clutch has been employed, and it is my particular object to provide such a clutch which will have novel means for preventing wear or slippage, as will be hereinafter described.

Other objects and advantages will appear hereinafter.

In the annexed drawings, which are for illustrative purposes only: Figure 1 is an elevation of my invention. Fig. 2 is a plan view. Fig. 3 is a section on the lines $x^3-x^3$ of Fig. 2. Fig. 4 is a perspective view of a portion of the structure showing the means of fastening the paddles. Fig. 5 is a view of the ratchet clutch. Fig. 6 is a view of the drive shaft and attached parts.

These drawings show a single pair of units, but it is evident that the number of such units may be changed without in any way affecting the question of patentability.

In the drawings 10 and 11 are a pair of beams supported upon a pier structure, not shown, below which a body of water 12 is allowed free motion. Supported on these beams are two paddle shafts 13 carried in bearings 14 and 15. Carried on the shafts 13 are a pair of forgings 16 to which are secured members 17. These members are tied together at their lower end by suitable cross bracing shown at 18. Sliding freely between the members 17 are a second pair of members 19 which are tied together at the top by the cross piece 20 and at the bottom by the paddles 21 which are flat plates bolted to the members 19 by the bolts 22 and spaced apart therefrom by the spacers 23. Eye bolts 24 in the cross pieces 20 provide a point of attachment for the cables 25. The paddles 20 are raised and lowered in the members 17 by the cables 25 which pass upwardly and over drums 26 which turn freely on the shaft 13 and which are provided with a spur gear 27 into which a pinion 28 meshes. The pinion 28 is carried on a shaft 29 which turns in bearings 30' formed on an extension of the bearing 15. At the outer end the shaft 29 has a ratchet wheel 30 keyed thereon and is also provided with a crank 31. A weighted ratchet 32 turns freely on the shaft 13 and engages the teeth 33 of the ratchet wheel 30. It is evident that the drum 26 may turn by the crank 31 through the gear 27 and the pinion 28, thus raising or lowering the paddles 21 so that the ratchet 32 will hold the paddles at any position desired.

The forgings 16 are keyed to the shaft 13, and as the motion of the water sways the paddles 21 this shaft is rotated in one direction and the other. Keyed to the shafts 13 are the pulleys 34 which are provided with two grooves in which the belts 35 and 36 run, the belt 35 being direct and the belt 36 crossed, as plainly shown in Fig. 1. The belts 35 and 36 pass to driving pulleys 37 which are mounted to turn freely on the shaft 38. Carried on the shaft 38 are the clutch pulleys 39. The pulleys are cylindrical but are mounted very slightly eccentric on the shaft 38, being keyed thereto. On each of the pulleys 37 are three pins 40 upon each of which is mounted a clutch cam 41. These cams have curved lower surfaces adapted to jam against the outer surface of the clutch pulleys 39, being held in relation thereto by springs 42. Mounted in the center of the shaft 38 is a drive pulley and fly wheel 43. The shaft 38 is carried in bearings 44 mounted on pedestals 45 which are secured on the beams 10 and 11.

The method of operation of my invention is as follows: The paddles 21 being raised until they are just awash, and being held in this position by the ratchet 32, the motion of the water 12 sways the paddles 21 back and forth and turns the shaft 13 a portion of a revolution alternately in either direction. This motion somewhat magnified is transmitted to the pulleys 37 through the belts 35 and 36 by means of the pulley 34, one of pulleys 37 moving in a reverse direction to the other due to the crossing of the belt 36. Thus regardless of the direction of the paddle one of the pulleys 37 is always turning in a positive direction. The clutch cams 41 are so shaped that they drive the clutch pulleys 39 only when turned in a positive direction, slipping freely when actuated in the opposite direction. The result is that the shaft 38 is actuated by any positive motion of a paddle through the belt 35 and also by any negative motion through the belt 36. The shaft 38 may be indefinitely extended and any number of paddles used, all of them contributing to the positive motion of the shaft 38. As the motion of the water may be greater in one direction than in the other, the size of the pulleys 37 may be different to allow for this.

Particular stress should be laid upon the eccentricity of the pulleys 39 with the shaft 38. The particular function of this eccentricity is to provide for even wear on the cams 41, thus insuring a positive grip thereby over a long period. The reason for this even wear lies in the fact that as the pins 40 are concentric with the shaft 38, the distance from the center of these pins to the outer surface of the clutch pulleys 39 varies with the position of the pulleys on the shaft and the cams 41 consequently catch at different parts of their curved surface, thus insuring even wear. The drive pulley 43 may be utilized to actuate any sort of machinery through a suitable belt.

I claim as my invention:—

1. A wave motor comprising a supporting structure, a series of paddle shafts carried in bearings on said structure, paddles secured to and actuating said shafts, a double grooved pulley secured rigidly to each of said shafts, a drive shaft, a drive pulley on said shaft, a pair of driving pulleys for each of said paddle shafts turning loosely on said drive shaft, and ratchet means for causing said driving pulleys to actuate the drive shaft only when turned in one direction.

2. A wave motor comprising a supporting structure, a series of paddle shafts carried in bearings on said structure, paddles secured to and actuating said shafts, a double grooved pulley secured rigidly to each of said shafts, a drive shaft, a drive pulley on said shaft, a pair of driving pulleys for each of said paddle shafts turning loosely on said drive shaft, a clutch pulley for each driving pulley, and means for causing said driving pulleys to actuate said clutch pulleys when turned in one direction only.

3. A wave motor comprising a supporting structure, a series of paddle shafts carried in bearings on said structure, paddles secured to and actuating said shafts, a double grooved pulley secured rigidly to each of said shafts, a drive shaft, a drive pulley on said shaft, a pair of driving pulleys for each of said paddle shafts turning loosely on said drive shaft, a clutch pulley for each driving pulley, and a series of clutch cams adapted to move said clutch pulleys when said driving pulleys are turned in one direction only.

4. A wave motor comprising a supporting structure, a series of paddle shafts carried in bearings on said structure, paddles secured to and actuating said shafts, a double grooved pulley secured rigidly to each of said shafts, a drive shaft, a drive pulley on said shaft, a pair of driving pulleys for each of said paddle shafts turning loosely on said drive shaft, a clutch pulley for each driving pulley, and a series of clutch cams carried on said driving pulleys and elastically held in contact with said clutch pulley to drive it when said driving pulley is rotated in one direction only.

In testimony whereof, I have hereunto set my hand at Los Angeles, California, this 28th day of November, 1913.

HANS P. MOLANDER.

In presence of—
 FRED A. MANSFIELD,
 FORD W. HARRIS.

---

Copies of this patent may be obtained for five cents each, by addressing the "Commissioner of Patents, Washington, D. C."